United States Patent
Liu et al.

(10) Patent No.: US 10,685,201 B2
(45) Date of Patent: Jun. 16, 2020

(54) METHOD AND SYSTEM FOR RECOGNIZING LOCATION INFORMATION IN TWO-DIMENSIONAL CODE

(71) Applicant: ALIBABA GROUP HOLDING LIMITED, Grand Cayman (KY)

(72) Inventors: Huan Liu, Hangzhou (CN); Wenrong Liu, Hangzhou (CN); Yinhai Tu, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 16/252,138

(22) Filed: Jan. 18, 2019

(65) Prior Publication Data
US 2019/0156092 A1  May 23, 2019

Related U.S. Application Data

(63) Continuation of application No. PCT/CN2017/093370, filed on Jul. 18, 2017.

(30) Foreign Application Priority Data

Jul. 22, 2016 (CN) .......................... 2016 1 0584889

(51) Int. Cl.
*G06K 7/10* (2006.01)
*G06K 7/14* (2006.01)
*G06T 7/13* (2017.01)

(52) U.S. Cl.
CPC ............. *G06K 7/1452* (2013.01); *G06K 7/10* (2013.01); *G06K 7/14* (2013.01); *G06K 7/1417* (2013.01); *G06T 7/13* (2017.01)

(58) Field of Classification Search
CPC ... G06K 7/1443; G06K 19/06037; G06K 7/14
(Continued)

(56) References Cited

U.S. PATENT DOCUMENTS

| 5,616,905 A | 4/1997 | Sugiyama |
| 6,360,948 B1 | 3/2002 | Yang et al. |

(Continued)

FOREIGN PATENT DOCUMENTS

| CA | 2456778 C | 2/2003 |
| CN | 1218269 C | 9/2005 |

(Continued)

OTHER PUBLICATIONS

First Search dated Mar. 20, 2019, issued in related Chinese Application No. 2016105848891 (2 pages).

(Continued)

*Primary Examiner* — Ahshik Kim
(74) *Attorney, Agent, or Firm* — Sheppard Mullin Richter & Hampton LLP

(57) ABSTRACT

A method and a system for recognizing location information in a two-dimensional code are provided. The method comprises: acquiring a two-dimensional code in an image; performing, according to a main positioning block of the two-dimensional code, feature detection to recognize location information in the two-dimensional code; and determining, according to the location information in the two-dimensional code, spatial location information of the two-dimensional code in the image.

20 Claims, 11 Drawing Sheets

(58) Field of Classification Search
USPC .................................................. 235/462.09
See application file for complete search history.

(56) References Cited

U.S. PATENT DOCUMENTS

| | | | |
|---|---|---|---|
| 6,604,682 | B2 | 8/2003 | Wakamiya et al. |
| 6,863,218 | B2 | 3/2005 | Muramatsu |
| 7,032,823 | B2 | 4/2006 | Nojiri |
| 7,636,483 | B2 | 12/2009 | Yamaguchi et al. |
| 7,751,629 | B2 | 7/2010 | Cheong et al. |
| 7,770,803 | B2 | 8/2010 | Onishi |
| 8,061,615 | B2 | 11/2011 | Yada |
| 2007/0069026 | A1 | 3/2007 | Aoyama |
| 2007/0187512 | A1 | 8/2007 | Yada |
| 2009/0323959 | A1* | 12/2009 | Hara .................. G09C 5/00 380/277 |
| 2011/0290879 | A1* | 12/2011 | Guo .................. G06K 7/10851 235/437 |
| 2011/0290882 | A1* | 12/2011 | Gu .................. G06K 7/1456 235/462.11 |
| 2012/0314096 | A1 | 12/2012 | Kruglick |
| 2014/0210857 | A1 | 7/2014 | Liu et al. |
| 2015/0278573 | A1 | 10/2015 | Hwang |
| 2015/0348272 | A1 | 12/2015 | Takemoto et al. |
| 2016/0267369 | A1* | 9/2016 | Picard .................. G06K 7/1417 |
| 2017/0039463 | A1* | 2/2017 | Hosokane .................. G06K 1/12 |
| 2017/0046606 | A1* | 2/2017 | Hosokane .................. G06K 19/06 |

FOREIGN PATENT DOCUMENTS

| | | |
|---|---|---|
| CN | 1248147 C | 3/2006 |
| CN | 100502444 C | 6/2009 |
| CN | 101615259 B | 4/2013 |
| CN | 103049728 A | 4/2013 |
| CN | 103971079 A | 8/2014 |
| CN | 104008359 A | 8/2014 |
| CN | 104268498 A | 1/2015 |
| CN | 104809422 A | 7/2015 |
| CN | 104951726 A | 9/2015 |
| CN | 106897648 A | 6/2017 |
| JP | 3458737 B2 | 10/2003 |
| JP | 2007-090448 A | 4/2007 |
| JP | 2007-213359 A | 8/2007 |
| JP | 3996520 B2 | 10/2007 |
| JP | 4180497 B2 | 11/2008 |
| JP | 4515999 B2 | 8/2010 |
| JP | 4810918 B2 | 11/2011 |
| JP | 2014-199510 A | 10/2014 |
| JP | 2015-191531 A | 11/2015 |
| KR | 10-0563875 B1 | 3/2006 |
| KR | 10-0828539 B1 | 5/2008 |
| KR | 1020120106519 A | 9/2012 |
| KR | 1020130115332 A | 10/2013 |
| KR | 101334049 B1 | 11/2013 |
| WO | 2014/114118 A1 | 7/2014 |

OTHER PUBLICATIONS

First Office Action dated Mar. 29, 2019, issued in related Chinese Application No. 2016105848891, with English machine translation (14 pages).

Second Office Action dated Aug. 21, 2019, issued in related Chinese Application No. 2016105848891, with English machine translation (15 pages).

PCT International Search Report and the Written Opinion dated Oct. 24, 2017, issued in related International Application No. PCT/CN2017/093370, with English translation (15 pages).

PCT International Preliminary Report on Patentability dated Jan. 31, 2019, issued in related International Application No. PCT/CN2017/093370, with English translation (12 pages.).

Office Action and Search Report dated May 31, 2019, issued in related Taiwan Application No. 106119329 (8 pages).

Office Action for Korean Application No. 10-2019-7005252 dated Sep. 27, 2019 (9 pages).

Search Report for European Application No. 17830462.2 dated Feb. 4, 2020.

Notice of Allowance for Korean Application No. 10-2019-7005252 dated Feb. 7, 2020.

Office Action for Japanese Application No. 2019-503329 dated Mar. 31, 2020.

Hirose Makoto, et al., Estimation of Intrinsic Camera Parameters Using QR code, The Papers of Technical Meeting, IEE Japan, The Institute of Electrical Engineers of Japan, Mar. 26, 2010, pp. 33 to 38 (English Abstract provided).

Li, et al., Reconstruct Argorithm of 2D Barcode for Reading the QR Code on Cylindrical Surface, 2013 International Conference on Anti-Counterfeiting, Security and Identification (ASID) [online], IEEE, Oct. 27, 2013 [Retrieval Date: Mar. 24, 2020], pp. 1 to 5, Internet <URL:https://ieeexplore.ieee.org/document/6825309>.

* cited by examiner

_US 10,685,201 B2_

METHOD AND SYSTEM FOR RECOGNIZING LOCATION INFORMATION IN TWO-DIMENSIONAL CODE

CROSS-REFERENCE TO RELATED APPLICATIONS

The present application is a continuation application of International Patent Application No. PCT/CN2017/093370, filed on Jul. 18, 2017, which is based on and claims priority to the Chinese Patent Application No. 201610584889.1, filed on Jul. 22, 2016 and entitled "Method and System for Recognizing Location Information in Two-Dimensional Code." The above-referenced applications are incorporated herein by reference in their entirety.

TECHNICAL FIELD

The present application relates to the field of computer technologies, and in particular, to a method and a system for recognizing location information in a two-dimensional code.

BACKGROUND

Augmented Reality (AR) is a new technology that "seamlessly" integrates real world information and virtual world information. Information of entities (visual information, sound, taste, touch, and the like) originally difficult to be experienced in a temporal and spatial range in the real world can be simulated and overlaid to the real world by using computer technologies for people to sense, thereby achieving sensory experience beyond reality.

In current technologies, AR technologies using two-dimensional codes as markers are implemented primarily in the following two manners:

(1) Two-dimensional code contour method.

According to this method, a two-dimensional code contour is used as a feature point set. A system presets a two-dimensional code contour feature point set, and then matches other scanned two-dimensional codes with the preset feature point set. The main drawback of this method is as follows: two-dimensional codes have different patterns due to different code values, for example, the pattern size and density of black and white blocks can vary in many ways, and therefore, two-dimensional code contours are not stable. As a result, the tracking accuracy is not stable (the accuracy is high for similar contours, and the accuracy is low for significantly different contours).

(2) Regeneration method.

According to this method, a two-dimensional code contour is first decoded to obtain a code value character string, and then a standard two-dimensional code image is regenerated to be identical to the scanned two-dimensional code. Subsequently, feature points are extracted from the newly generated two-dimensional code image, and the obtained feature point set is used as the preset feature point set for a system. The main drawback of this method is as follows: the system needs to repeat the steps above for any new two-dimensional code to generate a new preset feature point set. This process is relatively time consuming, thereby slowing down the processing speed of the entire system.

In summary, it can be seen that AR technologies using two-dimensional codes as markers according to current technologies have problems of slow recognition speed and low tracking accuracy.

SUMMARY

The main objective of the present application is to provide a method and a system for recognizing location information in two-dimensional code to solve the problems of slow recognition speed and low tracking accuracy that exist in AR solutions using two-dimensional codes as markers according to the current technologies.

According to one aspect, a method for recognizing location information in a two-dimensional code is provided according to some embodiments of the present application, the method comprising: acquiring a two-dimensional code in an image; performing, according to a main positioning block of the two-dimensional code, feature detection to recognize location information in the two-dimensional code; and determining, according to the location information in the two-dimensional code, spatial location information of the two-dimensional code in the image.

In some embodiments, the method further comprises: tracking the location information in the two-dimensional code.

In some embodiments, the step of performing, according to a main positioning block of the two-dimensional code, feature detection comprises: determining one or more main positioning blocks of the two-dimensional code; acquiring location information of a central point of each main positioning block and location information of a plurality of corner points of the each main positioning block, respectively; and using the acquired location information of the one or more central points of the one or more main positioning blocks and the location information of the plurality of corner points of the one or more main positioning blocks as a feature point set to perform feature detection.

In some embodiments, location information of 12, 8, or 4 corner points of the each main positioning block is acquired.

In some embodiments, the step of performing, according to a main positioning block of the two-dimensional code, feature detection comprises: determining one or more main positioning blocks of the two-dimensional code; acquiring location information of a central point of each main positioning block and location information of a plurality of central points of boundary edges between black and white pixels of the each main positioning block, respectively; and using the acquired location information of the one or more central points of the one or more main positioning blocks and the location information of the plurality of central points of boundary edges between black and white pixels of the one or more main positioning blocks as a feature point set to perform feature detection.

In some embodiments, location information of 12, 8, or 4 central points of boundary edges between black and white pixels of the each main positioning block is acquired.

In some embodiments, the step of determining, according to the location information in the two-dimensional code, spatial location information of the two-dimensional code in the image comprises: acquiring preset standard location information; and matching the standard location information with the location information in the two-dimensional code to obtain the spatial location information of the two-dimensional code in the image.

In some embodiments, the two-dimensional code is a quick response (QR) two-dimensional code.

In some embodiments, the method further comprises: acquiring virtual application data corresponding to the two-dimensional code; and determining a spatial location of the virtual application data according to the spatial location information of the two-dimensional code in the image.

According to another aspect, a system for recognizing location information in a two-dimensional code, comprises a processor and a non-transitory computer-readable storage medium coupled to the processor and storing instructions.

The instructions are executable by the processor to cause the system to perform a method, the method comprising: acquiring a two-dimensional code in an image; performing, according to a main positioning block of the two-dimensional code, feature detection to recognize location information in the two-dimensional code; and determining, according to the location information in the two-dimensional code, spatial location information of the two-dimensional code in the image.

According to further another aspect, a system for recognizing location information in a two-dimensional code is further provided according to some embodiments of the present application, the system comprising: an acquiring module configured to acquire a two-dimensional code in an image; a recognizing module configured to perform, according to a main positioning block of the two-dimensional code, feature detection to recognize location information in the two-dimensional code; and a spatial location determining module configured to determine, according to the location information in the two-dimensional code, spatial location information of the two-dimensional code in the image.

In some embodiments, the system further comprises: a tracking module configured to track the location information in the two-dimensional code.

In some embodiments, the recognizing module comprises: a first determining module configured to determine one or more main positioning blocks of the two-dimensional code; a first acquiring module configured to acquire location information of a central point of each main positioning block and location information of a plurality of corner points of the each main positioning block, respectively; and a first detecting module configured to use the acquired location information of the one or more central points of the one or more main positioning blocks and the location information of the plurality of corner points of the one or more main positioning blocks as a feature point set to perform feature detection.

In some embodiments, the first acquiring module acquires location information of 12, 8, or 4 corner points of the each main positioning block.

In some embodiments, the recognizing module comprises: a second determining module configured to determine one or more main positioning blocks of the two-dimensional code; a second acquiring module configured to acquire location information of a central point of each time positioning block and location information of a plurality of central points of boundary edges between black and white pixels of the each main positioning block, respectively; and a second detecting module configured to use the acquired location information of the one or more central points of the one or more main positioning blocks and the location information of the plurality of central points of boundary edges between black and white pixels of the one or more main positioning blocks as a feature point set to perform feature detection.

In some embodiments, the second acquiring module acquires location information of 12, 8, or 4 central points of boundary edges between black and white pixels of the each main positioning block.

In some embodiments, the spatial location determining module is configured to acquire preset standard location information; and match the standard location information with the location information in the two-dimensional code to obtain the spatial location information of the two-dimensional code in the image.

In some embodiments, the two-dimensional code is a quick response (QR) two-dimensional code.

In some embodiments, the system further comprises: a virtual application data acquiring module configured to acquire virtual application data corresponding to the two-dimensional code; and a location updating module configured to update a spatial location of the virtual application data according to the spatial location information of the two-dimensional code in the image.

According to yet another aspect, a non-transitory computer-readable storage medium stores instructions, which are executable by a processor to cause the processor to perform a method for recognizing location information in a two-dimensional code, the method comprising: acquiring a two-dimensional code in an image; performing, according to a main positioning block of the two-dimensional code, feature detection to recognize location information in the two-dimensional code; and determining, according to the location information in the two-dimensional code, spatial location information of the two-dimensional code in the image.

In summary, the present application uses a two-dimensional code as the Marker and performs feature detection on a preset location of a main positioning block of the two-dimensional code to recognize location information in the two-dimensional code. The extracted two-dimensional code feature point set has a fixed relative location, is highly unique and not easy to be confused with others, providing excellent tracking performance.

BRIEF DESCRIPTION OF THE DRAWINGS

The accompanying drawings to be described are used to provide further understanding of the present application and constitute a part of the present application. Exemplary embodiments and description thereof of the present application are used to describe the present application, and do not constitute improper limitations to the present application. In the accompanying drawings.

DETAILED DESCRIPTION

To make the objective, technical solutions, and advantages to be clearer, the technical solutions of the present application will be clearly and completely described below with reference to exemplary embodiments and corresponding accompanying drawings of the present application. Apparently, the described embodiments are merely some, not all, embodiments of the present application. All other embodiments obtainable by those skilled in the art without creative effort and on the basis of the embodiments of the present application shall fall within the scope of the present application.

Figure 1:
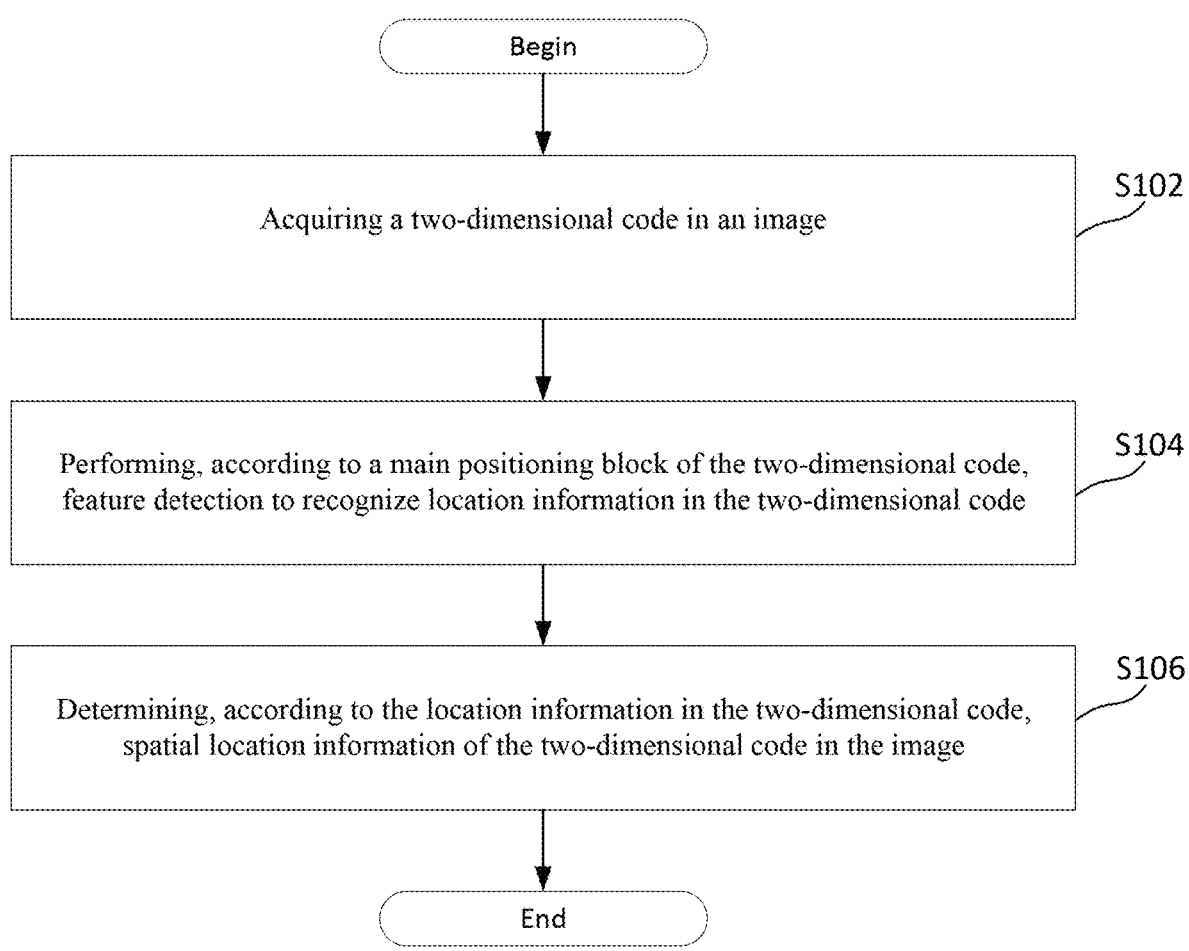
FIG. 1 is a flow chart of a method for recognizing location information in a two-dimensional code according to some embodiments of the present application.

FIG. 1 is a flow chart of a method for recognizing location information in a two-dimensional code according to some embodiments of the present application. As shown in FIG. 1, the method comprises:

Step S102, acquiring a two-dimensional code in an image.

A camera of a terminal device is used to acquire a real-world scenario image containing a two-dimensional code. The terminal device may be a smartphone, a tablet computer, a digital camera, or other similar terminal devices. Then, the input two-dimensional code image is pre-processed, including: performing grayscale conversion on the image to obtain a grayscale image, and performing binarization processing on the grayscale image. In some embodiments of the present application, the two-dimensional code may be a QR code.

Step S104, performing, according to a main positioning block of the two-dimensional code, feature detection to recognize location information in the two-dimensional code.

In the present application, the location information in the two-dimensional code comprises: information of locations of a central point, corner points, central points of boundary edges between black and white pixels, and the like of a main positioning block of the two-dimensional code. With the above location information, the location of the two-dimensional code on a plane can be determined, i.e., spatial location information, such as the direction, rotation angle, inclination angle, and the like of the two-dimensional code, is determined.

Figure 2A:
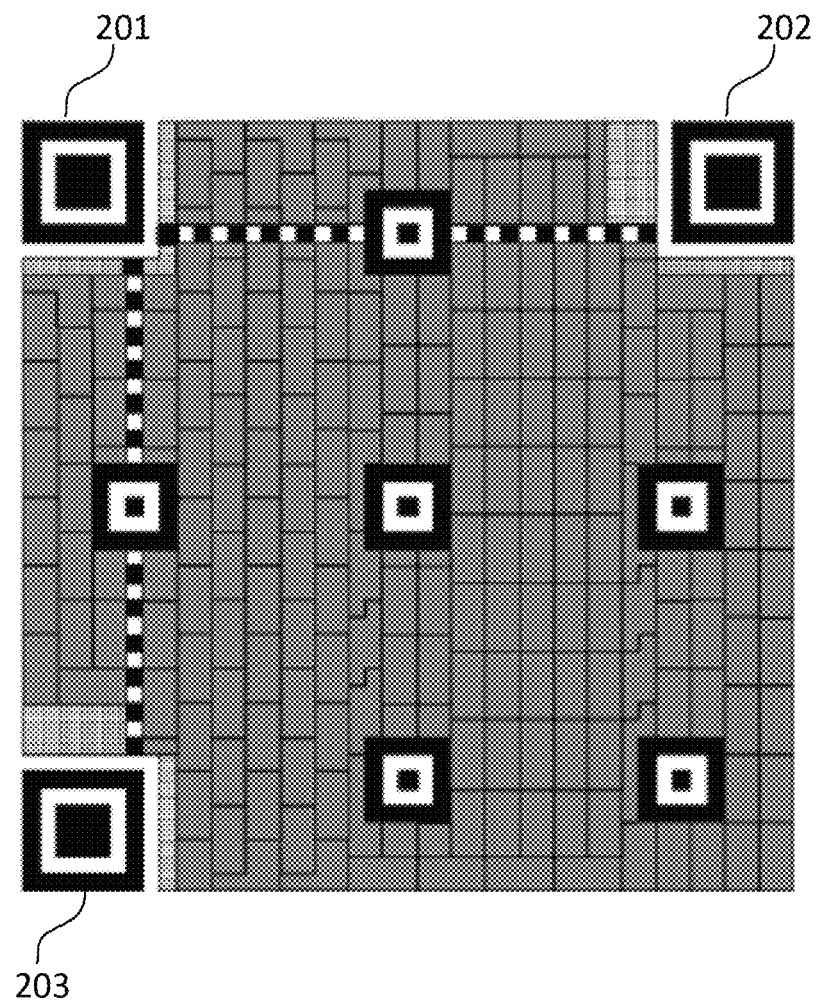
FIGS. 2A and 2B are composition structure diagrams of main positioning blocks of a QR code according to some embodiments of the present application.
Figure 2B:
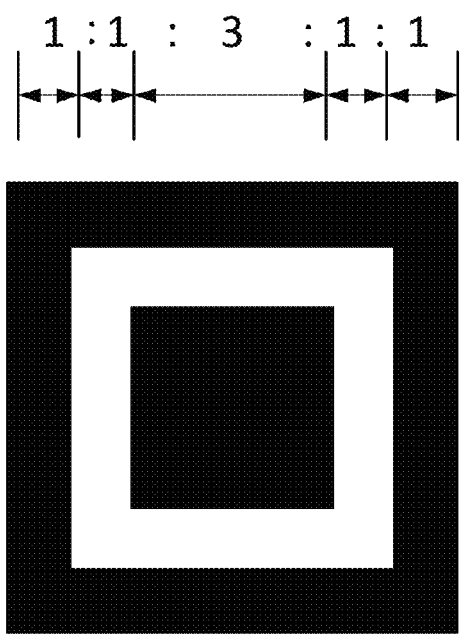

Referring to FIG. 2A, FIG. 2A is a composition structure diagram of main positioning blocks of a QR code. The positioning blocks of the QR code includes two types: main positioning blocks and auxiliary positioning blocks, where the main positioning blocks comprise three big homocentric squares regions, such as the left top corner 201, the right top corner 202, and the left bottom corner 203, while the auxiliary positioning blocks are small black-framed blocks in the middle of the QR code. There are only three main positioning blocks, while the number of auxiliary positioning blocks can increase along with increased density of two-dimensional codes. Referring to FIG. 2B, a feature of the main positioning blocks is that the length ratio of the line segments formed by black and white pixels is 1:1:3:1:1. Feature extraction can be performed on a two-dimensional code and the location of the code can be detected according to this feature. Since main positioning blocks are common among all two-dimensional codes, and their patterns have fixed shapes and locations, the main positioning blocks can be used as universal identifiers for two-dimensional code patterns, i.e., the main positioning blocks can be used as a universal feature point set of two-dimensional code patterns. The feature extraction process on main positioning blocks will be described in detail below.

Figure 3A:
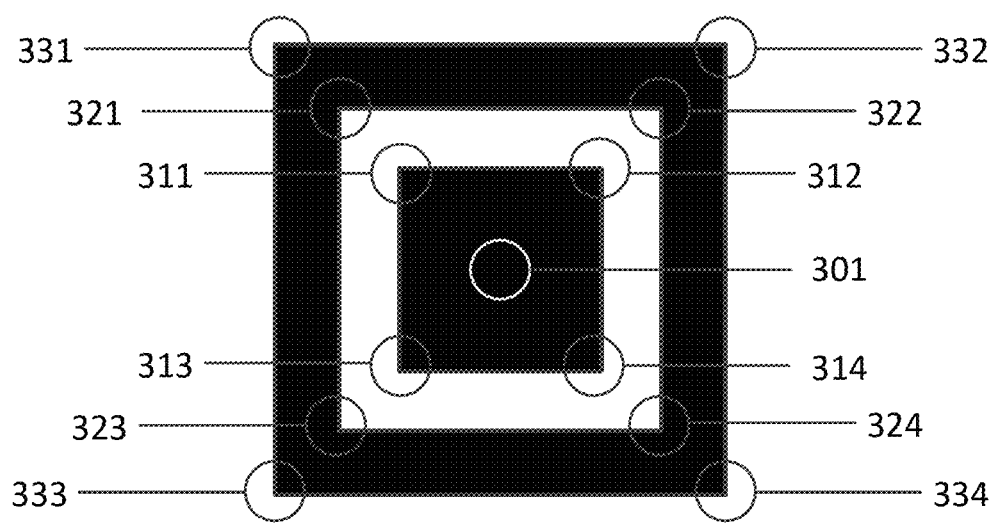
FIGS. 3A and 3B are schematic diagrams of feature point extraction according to some embodiments of the present application.

In some embodiments of the present application, central points and corner points of main positioning blocks can be used as a feature point set. As shown in FIG. 3A, corner points are the points at the right angles in the main positioning blocks, and corner points are also points where pixels in the image change drastically. With the central point 301 of the main positioning block as a starting point, corner points around the starting point are detected. It can be seen that a first group of 4 corner points (311, 312, 313, and 314) is the closest to the central point 301, there is a second group of 4 corner points (321, 322, 323, and 324) outside of the first group of 4 corner points, and there is further a third group of 4 corner points (331, 332, 333, and 334) outside of the second group of 4 corner points. In the present application, the central point 301 and any one of the above three groups (i.e., 4 corner points), or any two of the three groups (i.e., 8 corner points), or all three groups (i.e., 12 corner points) can be used as the feature point set. In other words, the feature point set of a main positioning block can have 5, 9, or 13 feature points. In such a manner, if one two-dimensional code has three main positioning blocks, and if 5 feature points are selected for each main positioning block, there is a total of 15 feature points; if 9 feature points are selected for each main positioning block, there is a total of 27 feature points; and if 13 feature points are selected for each main positioning block, there is a total of 39 feature points. It should be noted that the same number of feature points are selected for each main positioning block in the description above. In other embodiments, a different number of feature points may be selected for each main positioning block, which will not be described herein.

Figure 3B:
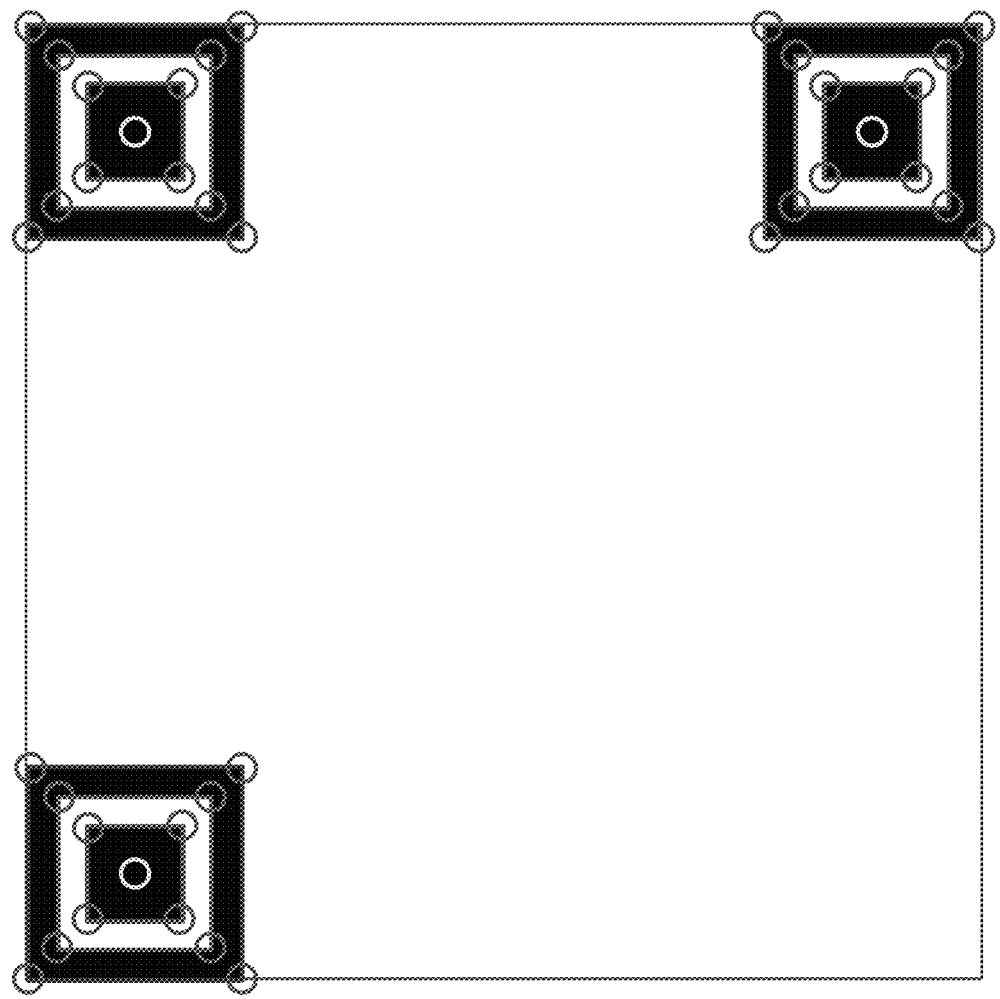

For example, the number of feature points in a feature point set may be selected according to actual situations. The more feature points are selected, the more accurate the calculation result becomes, but the higher the amount of calculation becomes; when fewer feature points are selected, the amount of calculation is lower, but calculation results may have errors may. FIG. 3B is a schematic diagram of the highest amount of selected feature points in the feature point set. Referring to FIG. 3B, 39 feature points can be obtained in the entire two-dimensional code image, and the relative locations of these 39 feature points are fixed, i.e., these 39 feature points can be uniquely determined.

Figure 4:
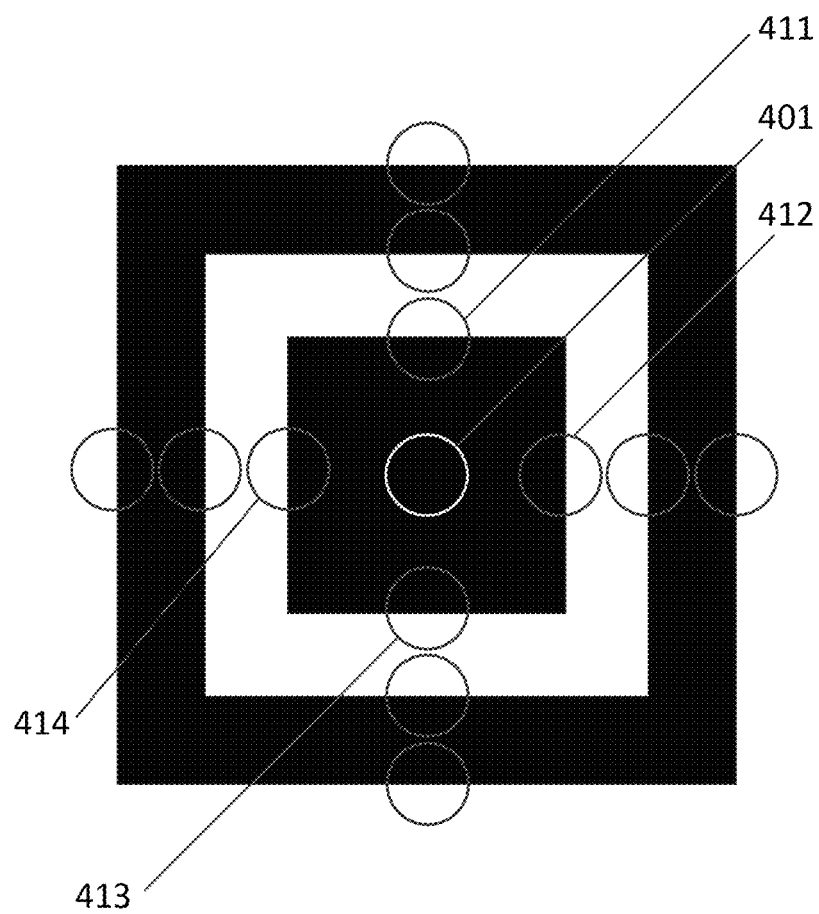
FIG. 4 is a schematic diagram of feature point extraction according to some other embodiments of the present application.

In some embodiments of the present application, central points and central points of boundary edges between black and white pixels of main positioning blocks can be used as a feature point set. An example of one main positioning block is described below. Referring to FIG. 4, 401 represents a central point of the main positioning block. With the central point 401 as a starting point, central points of boundary edges between black and white pixels around the starting point are detected. A first group of 4 central points of boundary edges between black and white pixels (411, 412, 413, and 414) is the closest to the central point 401, there is a second group of 4 corner points (not marked) outside of the first group of 4 corner points, and there is further a third group of 4 corner points (not marked) outside of the second group of 4 corner points. Similar to the method of acquiring corner points, 4, 8, or 12 central points of boundary edges between black and white pixels can be acquired from one main positioning block, and one feature point set can have 5, 9, or 13 feature points when the central point is included. 15, 27, or 39 feature points can be acquired from three main positioning blocks of one two-dimensional code.

In the present application, a two-dimensional code is used as the Marker, and the location of the two-dimensional code can be effectively recognized by performing feature detection on a preset location of main positioning blocks of the two-dimensional code.

Step S106, determining, according to the location information in the two-dimensional code, spatial location information of the two-dimensional code in the image.

For example, preset standard location information is acquired, and the standard location information is matched with the location information in the two-dimensional code to obtain the spatial location information of the two-dimensional code in the image (including spatial location parameters and rotation parameters). In an exemplary application, the spatial location of a two-dimensional code can be continuously tracked by continuously taking real-world scenario images that contain the two-dimensional code, and the obtained spatial location of the two-dimensional code can be used in AR technologies, which will be described in detail below with reference to FIG. 5.

Figure 5:
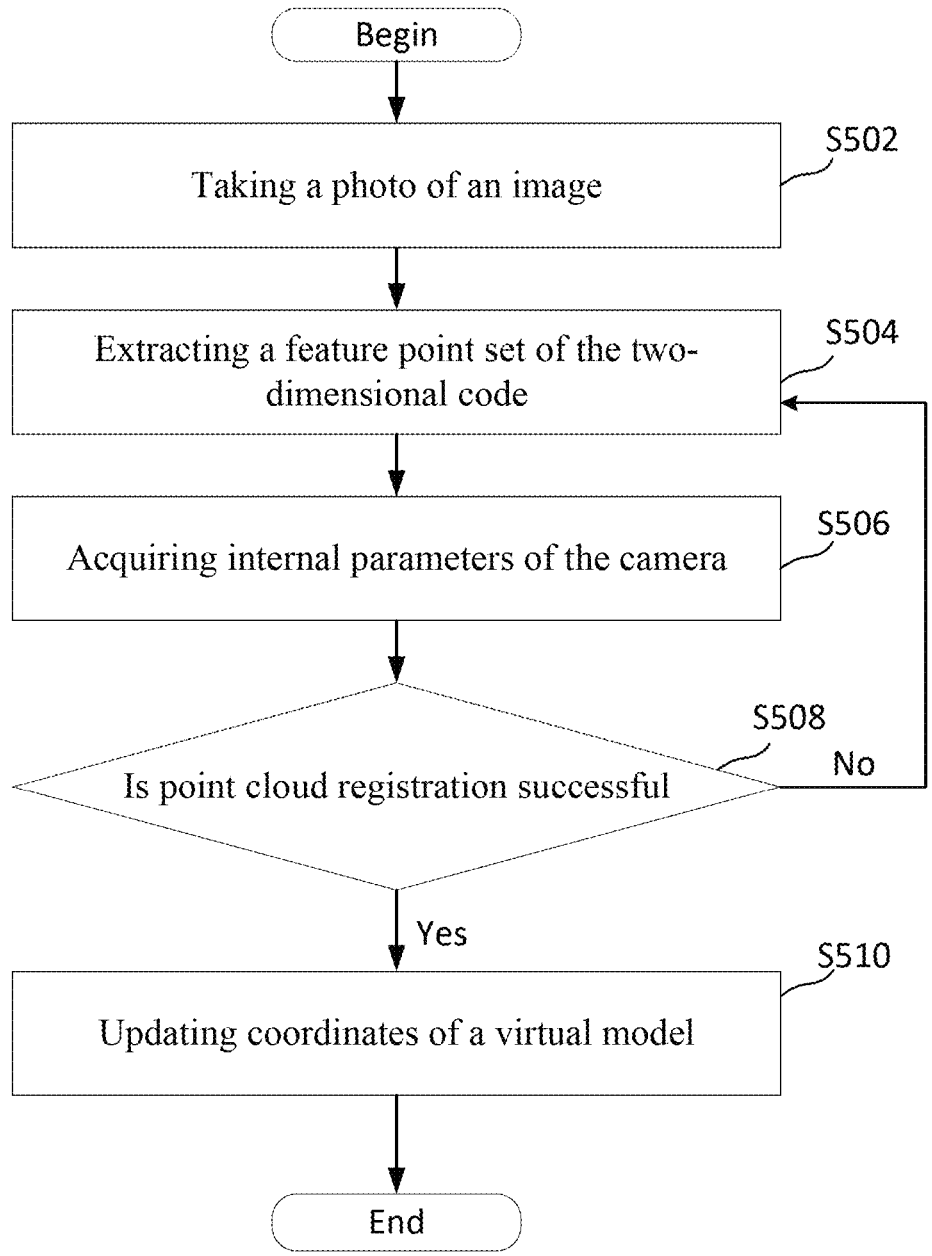
FIG. 5 is a flow chart of a method for recognizing location information in a two-dimensional code according to some other embodiments of the present application.

FIG. 5 is a flow chart of a method for recognizing location information in a two-dimensional code according to some other embodiments of the present application. As shown in FIG. 5, the method comprises:

Step S502, launching a camera of a terminal device (for example, a smartphone, a tablet computer, a digital camera, and the like), and taking a photo of a real-world scenario image that contains a two-dimensional code.

Step S504, scanning the two-dimensional code, and extracting a feature point set of the two-dimensional code. The description of FIG. 3 or FIG. 4 may be referenced for steps of extracting a feature point set of the two-dimensional code. If the extraction of a feature point set fails, the method repeats Step S502.

Step S506, acquiring internal parameters of the camera, such as focal distance, image center, and the like.

Step S508, performing point cloud registration. If successful, the method proceeds to execute Step S510; otherwise, the method returns to Step S502.

For example, preset standard location information is acquired, e.g., a location of a front view of the two-dimensional code taken by the camera can be used as a standard location. By combining the standard location information with the pre-acquired internal parameters of the camera (such as focal distance, image center, and the like), a first point cloud data (e.g., a 3d point cloud) of the feature point set of the standard location can be obtained. Similarly, by combining the extracted feature point set of the two-dimensional code with the internal parameters of the camera, a second point cloud data (e.g., a 3d point cloud) of the feature point set of the two-dimensional code can be obtained. Then, point cloud registration is performed based on the first point cloud data and the second point cloud data, and the location relationship between the first point cloud data and the second point cloud data is calculated to obtain spatial location information of the two-dimensional code in the image (i.e., the spatial location of the camera).

Step S510, updating a spatial location of a virtual object by using the spatial location of the camera, so as to complete the entire flow of AR, where the virtual object includes: any one or a combination of several of texts, images, videos, 3D models, animations, sounds, and geographical location information.

Figure 6:
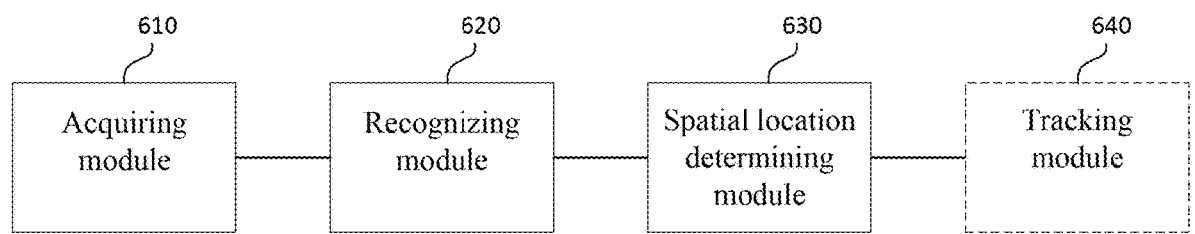
FIG. 6 is a structural block diagram of a system for recognizing location information in a two-dimensional code according to some embodiments of the present application.

FIG. 6 is a structural block diagram of a system for recognizing location information in a two-dimensional code according to some embodiments of the present application. As shown in FIG. 6, the system comprises:

an acquiring module 610 configured to acquire a two-dimensional code in an image;

a recognizing module 620 configured to perform, according to a main positioning block of the two-dimensional code, feature detection to recognize location information in the two-dimensional code;

a spatial location determining module 630 configured to determine, according to the location information in the two-dimensional code, spatial location information of the two-dimensional code in the image; furthermore, the spatial location determining module 630 being configured to acquire preset standard location information and match the standard location information with the location information in the two-dimensional code to obtain the spatial location information of the two-dimensional code in the image; and a tracking module 640 configured to track the location information in the two-dimensional code, and to determine the spatial location information of the two-dimensional code in the image according to new location information in the two-dimensional code.

Figure 7A:
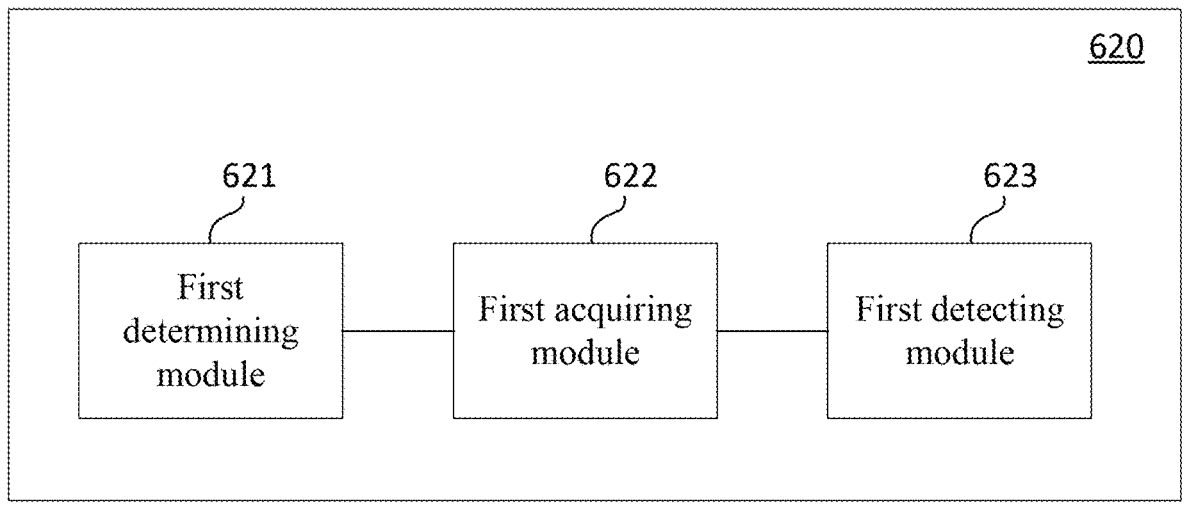
FIGS. 7A and 7B are structural block diagrams of a recognizing module according to some embodiments of the present application.

In some embodiments of the present application, referring to FIG. 7A, the recognizing module 620 further comprises:

a first determining module 621 configured to determine one or more main positioning blocks of the two-dimensional code;

a first acquiring module 622 configured to acquire location information of a central point of each main positioning block and location information of a plurality of corner points of the each main positioning block, respectively, where the first acquiring module is configured to acquire location information of 12, 8, or 4 corner points of the each main positioning block; and a first detecting module 623 configured to use the acquired location information of the one or more central points of the one or more main positioning blocks and the location information of the plurality of corner points of the one or more main positioning blocks as a feature point set to perform feature detection.

Figure 7B:
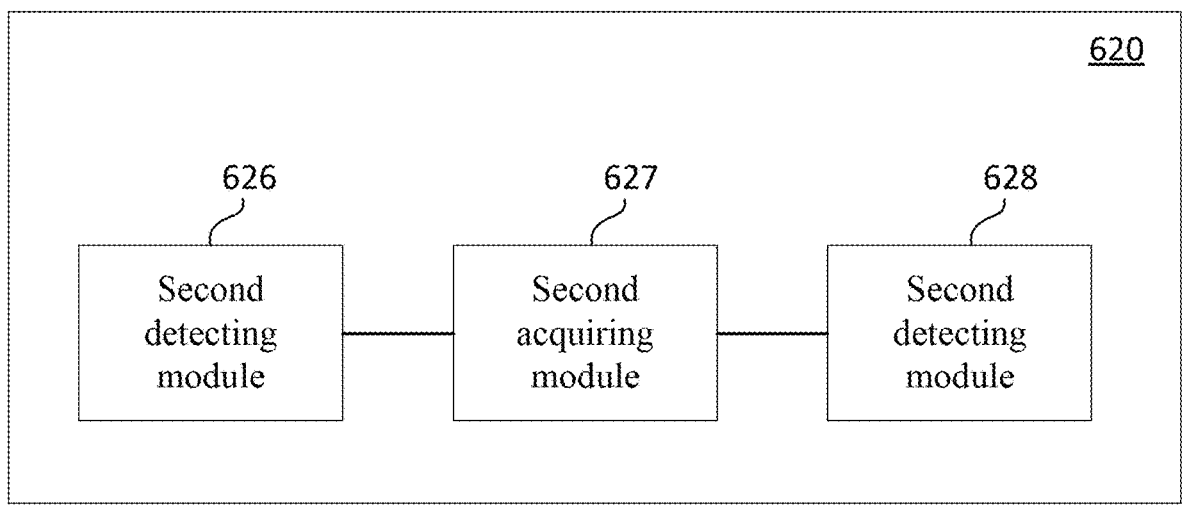

In some embodiments of the present application, referring to FIG. 7B, the recognizing module 620 further comprises:

a second determining module 626 configured to determine one or more main positioning blocks of the two-dimensional code;

a second acquiring module 627 configured to acquire location information of a central point of each main positioning block and location information of a plurality of central points of boundary edges between black and white pixels of the each main positioning block, respectively, where the second acquiring module is configured to acquire location information of 12, 8, or 4 central points of boundary edges between black and white pixels of the each main positioning block; and a second detecting module 628 configured to use the acquired location information of the one or more central points of the one or more main positioning blocks and the location information of the plurality of central points of boundary edges between black and white pixels of the one or more main positioning blocks as a feature point set to perform feature detection.

Figure 8:
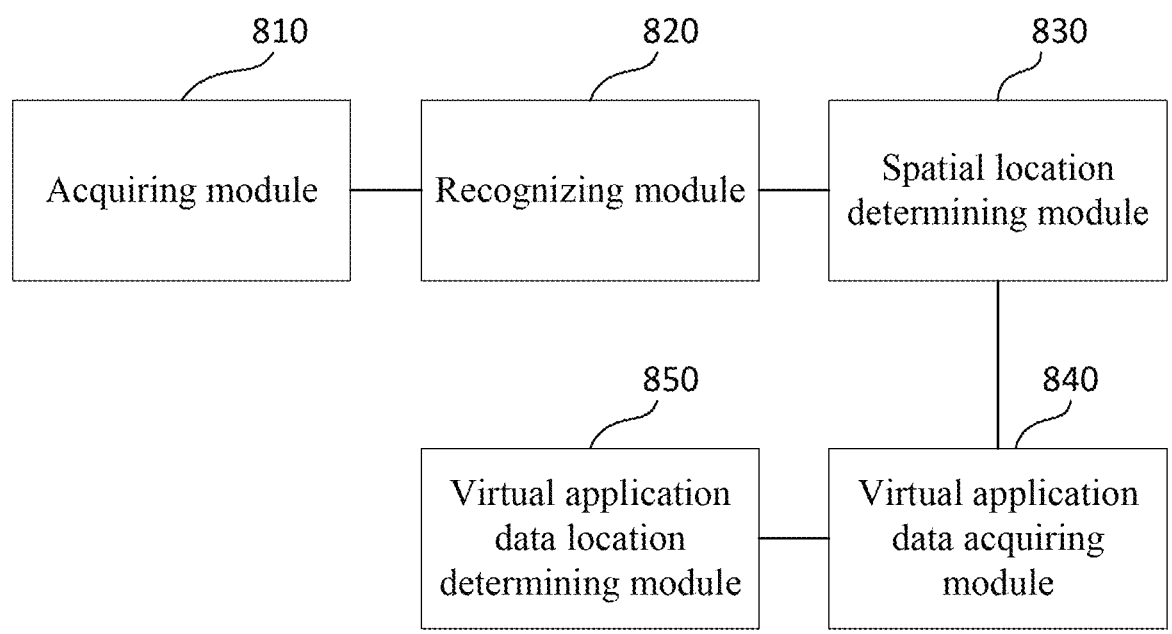
FIG. 8 is a structural block diagram of a system for recognizing location information in a two-dimensional code for AR technologies according to some other embodiments of the present application.

FIG. 8 is a structural block diagram of a system for recognizing location information in a two-dimensional code for AR technologies according to some embodiments of the present application. As show in FIG. 8, the system comprises:

an acquiring module 810 configured to acquire a two-dimensional code in an image;

a recognizing module 820 configured to perform, according to a main positioning block of the two-dimensional code, feature detection to recognize location information in the two-dimensional code;

a spatial location determining module 830 configured to calculate, according to the location information in the two-dimensional code, spatial location information of the two-dimensional code in the image;

a virtual application data acquiring module 840 configured to acquire virtual application data corresponding to the two-dimensional code; and a virtual application data location updating module 850 configured to determine a spatial location of the virtual application data according to the spatial location information of the two-dimensional code in the image.

In some embodiments, the systems in FIGS. 6-8 may each comprise a processor and a non-transitory computer-readable storage medium coupled to the processor and storing instructions that are executable by the processor to cause one or more components of the system (e.g., the processor) to perform various steps and methods of the modules and units described above. For example, at the hardware level, the each system, implementable by one or more computing devices, comprises a processor, and optionally may also comprise an internal bus, a network interface, and a storage device. Here, the storage device may include internal memory, for example, a high-speed random access storage device (random access memory, RAM), and may also include a non-volatile storage device (non-volatile memory), for example, at least one disk storage device. The each system may also include the hardware required by other services.

Operating steps of the method of the present application correspond to the structural features of the system, and reference may be made to each other, which will not be described one by one.

In summary, the present application uses a two-dimensional code as the Marker and performs feature detection on a preset location of a main positioning block of the two-dimensional code to recognize location information in the two-dimensional code. The extracted two-dimensional code feature point set has a fixed relative location, is highly unique and not easy to be confused with others, providing excellent tracking performance. The technical solutions according to the present application are applicable to all QR codes, making it unnecessary to regenerate a preset feature point set every time.

Those skilled in the art should understand that the embodiments of the present application may be provided as a method, a system, or a computer program product. Therefore, the present application may be implemented as a complete hardware embodiment, a complete software embodiment, or an embodiment combing software and hardware. Moreover, the present application may be in the form of a computer program product implemented on one or more computer usable storage media (including, but not limited to, a magnetic disk memory, CD-ROM, an optical memory, and the like) comprising computer usable program code therein. The program code can be executed to perform the methods described above.

In a typical configuration, a computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

It should be further noted that the terms of "including," "comprising" or any other variants thereof are intended to encompass a non-exclusive inclusion, such that a process, method, commodity or device comprising a series of elements not only includes these elements, but also includes other elements that are not specifically listed, or further includes elements that are inherent to the process, method, commodity or device. When there is no further restriction, an element defined by the statement of "comprising one . . . ." does not exclude additional identical elements included in the process, method, commodity or device comprising the above defined element.

The above-described is only embodiments of the present application, which are not used to limit the present application. To those skilled in the art, the present application may have various modifications and changes. Any modification, equivalent substitution or improvement made within the spirit and principle of the present application shall be encompassed by the claims of the present application.

What is claimed is:

1. A method for recognizing location information in a two-dimensional code, comprising:
   acquiring a two-dimensional code in an image;
   determining one or more main positioning blocks of the two-dimensional code;
   acquiring location information of one or more central points of the one or more main positioning blocks;
   using the acquired location information of the one or more central points of the one or more main positioning blocks to perform feature detection to recognize location information in the two-dimensional code; and
   determining, according to the location information in the two-dimensional code, spatial location information of the two-dimensional code in the image.

2. The method according to claim 1, further comprising:
   tracking the location information in the two-dimensional code to track the spatial location information of the two-dimensional code in the image.

3. The method according to claim 1, wherein acquiring location information of one or more central points of the one or more main positioning blocks and using the acquired location information of the one or more central points of the one or more main positioning blocks to perform feature detection to recognize location information in the two-dimensional code further comprises:
   acquiring location information of a central point of each main positioning block and location information of a plurality of corner points of the each main positioning block, respectively; and
   using the acquired location information of the one or more central points of the one or more main positioning blocks and the location information of the plurality of corner points of the one or more main positioning blocks to perform the feature detection.

4. The method according to claim 3, wherein location information of 12, 8, or 4 corner points of the each main positioning block is acquired.

5. The method according to claim 1, wherein acquiring location information of one or more central points of the one or more main positioning blocks and using the acquired location information of the one or more central points of the one or more main positioning blocks to perform feature detection to recognize location information in the two-dimensional code further comprises:
   acquiring location information of a central point of each main positioning block and location information of a plurality of central points of boundary edges between black and white pixels of the each main positioning block, respectively; and
   using the acquired location information of the one or more central points of the one or more main positioning blocks and the location information of the plurality of central points of boundary edges between black and white pixels of the one or more main positioning blocks to perform the feature detection.

6. The method according to claim 5, wherein location information of 12, 8, or 4 central points of boundary edges between black and white pixels of the each main positioning block is acquired.

7. The method according to claim 1, wherein the two-dimensional code is a quick response (QR) two-dimensional code.

8. The method according to claim 1, further comprising:
   acquiring data of a virtual object corresponding to the two-dimensional code; and
   determining a spatial location of the virtual object according to the spatial location information of the two-dimensional code in the image.

9. A system for recognizing location information in a two-dimensional code comprising a processor and a non-transitory computer-readable storage medium coupled to the processor and storing instructions executable by the processor to cause the system to perform a method, the method comprising:
   acquiring a two-dimensional code in an image;
   determining one or more main positioning blocks of the two-dimensional code;
   acquiring location information of one or more central points of the one or more main positioning blocks;
   using the acquired location information of the one or more central points of the one or more main positioning blocks to perform feature detection to recognize location information in the two-dimensional code; and
   determining, according to the location information in the two-dimensional code, spatial location information of the two-dimensional code in the image.

10. The system according to claim 9, wherein the method further comprises:
    tracking the location information in the two-dimensional code to track the spatial location information of the two-dimensional code in the image.

11. The system according to claim 9, wherein acquiring location information of one or more central points of the one or more main positioning blocks and using the acquired location information of the one or more central points of the one or more main positioning blocks to perform feature detection to recognize location information in the two-dimensional code further comprises:
    acquiring location information of a central point of each main positioning block and location information of a plurality of corner points of the each main positioning block, respectively; and
    using the acquired location information of the one or more central points of the one or more main positioning blocks and the location information of the plurality of corner points of the one or more main positioning blocks to perform the feature detection.

12. The system according to claim 11, wherein location information of 12, 8, or 4 corner points of the each main positioning block is acquired.

13. The system according to claim 9, wherein acquiring location information of one or more central points of the one or more main positioning blocks and using the acquired location information of the one or more central points of the one or more main positioning blocks to perform feature detection to recognize location information in the two-dimensional code further comprises:
    acquiring location information of a central point of each main positioning block and location information of a plurality of central points of boundary edges between black and white pixels of the each main positioning block, respectively; and
    using the acquired location information of the one or more central points of the one or more main positioning blocks and the location information of the plurality of central points of boundary edges between black and white pixels of the one or more main positioning blocks to perform the feature detection.

14. The system according to claim 13, wherein location information of 12, 8, or 4 central points of boundary edges between black and white pixels of the each main positioning block is acquired.

15. The system according to claim 9, wherein the step of determining, according to the location information in the two-dimensional code, spatial location information of the two-dimensional code in the image comprises:
    acquiring preset standard location information; and
    matching the standard location information with the location information in the two-dimensional code to obtain the spatial location information of the two-dimensional code in the image.

16. The system according to claim 9, wherein the two-dimensional code is a quick response (QR) two-dimensional code.

17. The system according to claim 9, wherein the method further comprises:
    acquiring data of a virtual object corresponding to the two-dimensional code; and
    determining a spatial location of the virtual object according to the spatial location information of the two-dimensional code in the image.

18. A non-transitory computer-readable storage medium storing instructions executable by a processor to cause the processor to perform a method for recognizing location information in a two-dimensional code, the method comprising:
    acquiring a two-dimensional code in an image;
    determining one or more main positioning blocks of the two-dimensional code;
    acquiring location information of one or more central points of the one or more main positioning blocks;
    using the acquired location information of the one or more central points of the one or more main positioning blocks to perform feature detection to recognize location information in the two-dimensional code; and determining, according to the location information in the two-dimensional code, spatial location information of the two-dimensional code in the image.

19. The non-transitory computer-readable storage medium in claim 18, wherein acquiring location information of one or more central points of the one or more main positioning blocks and using the acquired location information of the one or more central points of the one or more main positioning blocks to perform feature detection to recognize location information in the two-dimensional code further comprises:
   acquiring location information of a central point of each main positioning block and location information of a plurality of corner points of the each main positioning block, respectively; and
   using the acquired location information of the one or more central points of the one or more main positioning blocks and the location information of the plurality of corner points of the one or more main positioning blocks to perform the feature detection.

20. A method for recognizing location information in a two-dimensional code, comprising:
   acquiring a two-dimensional code in an image;
   performing, according to a main positioning block of the two-dimensional code, feature detection to recognize location information in the two-dimensional code;
   acquiring preset standard location information; and
   matching the preset standard location information with the recognized location information in the two-dimensional code to obtain the spatial location information of the two-dimensional code in the image.

* * * * *